(12) United States Patent
McCormack

(10) Patent No.: US 6,372,311 B2
(45) Date of Patent: *Apr. 16, 2002

(54) CHROME-PLATED BODYSIDE MOLDING FOR VEHICLE AND METHOD OF MAKING SAME

(75) Inventor: Brian McCormack, Warren, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/833,040

(22) Filed: Apr. 12, 2001

Related U.S. Application Data

(60) Division of application No. 09/547,758, filed on Apr. 12, 2000, which is a continuation-in-part of application No. 09/497,547, filed on Feb. 3, 2000.

(51) Int. Cl.[7] ................................................. B60R 13/00
(52) U.S. Cl. ........................ 428/31; 293/128; 293/155
(58) Field of Search ........................... 428/31; 293/128, 293/155

(56) References Cited

U.S. PATENT DOCUMENTS

| | | |
|---|---|---|
| 3,461,545 A | 8/1969 | Bush |
| 3,574,379 A | 4/1971 | Jordan |
| 3,687,502 A | 8/1972 | Loew |
| 4,063,004 A | 12/1977 | Quinn |
| 4,101,698 A | 7/1978 | Dunning et al. |
| 4,131,530 A | 12/1978 | Blum et al. |
| 4,363,839 A | 12/1982 | Watanabe et al. |
| 4,671,974 A | 6/1987 | Murachi |
| 4,838,004 A | 6/1989 | Adell |
| 4,946,727 A | 8/1990 | Kessler |
| 4,999,227 A | 3/1991 | Vander Togt |
| 5,112,549 A | 5/1992 | Roberts et al. |
| 5,149,569 A | 9/1992 | McCue |
| 5,178,746 A | 1/1993 | Darnall et al. |
| 5,186,509 A | 2/1993 | Tyves |
| 5,193,264 A | 3/1993 | Brown |
| 5,194,305 A | 3/1993 | Shirahata et al. |
| 5,202,172 A | 4/1993 | Graf |
| 5,229,174 A | 7/1993 | Riead |
| 5,229,175 A | 7/1993 | Seabolt |
| 5,242,734 A | 9/1993 | Rubin |
| 5,340,623 A | 8/1994 | Menjo et al. |
| 5,494,630 A | 2/1996 | Eraybar et al. |
| 5,520,765 A | 5/1996 | Zoller |
| 5,536,540 A | 7/1996 | Borys et al. |
| 5,560,175 A | 10/1996 | Soyka, Jr. et al. |
| 5,639,522 A | 6/1997 | Maki et al. |
| 5,641,547 A | 6/1997 | Dilley |
| 5,725,924 A | 3/1998 | Keys |
| 5,786,047 A | 7/1998 | Tomblin |
| 6,279,974 B1 * | 9/2001 | McCormack ............... 293/128 |

FOREIGN PATENT DOCUMENTS

| | | |
|---|---|---|
| EP | 342 429 | 11/1989 |
| JP | 58-221739 | 12/1983 |
| JP | 4-349048 | 12/1992 |

OTHER PUBLICATIONS

U.S. application No. 09/547,758, filed Apr. 12, 2000.
U.S. application No. 09/497,547, filed Feb. 3, 2000.

* cited by examiner

Primary Examiner—Deborah Jones
Assistant Examiner—Abraham Bahta
(74) Attorney, Agent, or Firm—Nixon & Vanherhye P.C.

(57) ABSTRACT

A multiple piece bodyside molding includes a cover piece connected to a base piece. The cover is formed in a manner and shape so that it may be chrome-plated while reducing the likelihood of bath/tank contamination during the chrome-plating process. Subsequent to being chrome-plated, the cover is connected to the base so as to form the resulting bodyside molding. The cover may be attached to the base via ultrasonic welding, vibration welding, snap-on connectors, or via heat-deforming or extension tabs in different embodiments of the invention.

3 Claims, 7 Drawing Sheets

CHROME-PLATED BODYSIDE MOLDING FOR VEHICLE AND METHOD OF MAKING SAME

This is a divisional of U.S. patent application Ser. No. 09/547,758, filed Apr. 12, 2000, which is a continuation-in-part of U.S. patent application Ser. No. 09/497,547, filed Feb. 3, 2000, the entire content of which is hereby incorporated by reference in this application.

FIELD OF THE INVENTION

This invention relates to a bodyside molding for a wheeled vehicle such as a car, sport utility vehicle, pick-up truck, or the like. More particularly, this invention relates to a chrome-plated bodyside molding and a method of making the same.

BACKGROUND OF THE INVENTION

Decorative and protective bodyside moldings formed at least in part from thermoplastic materials are known in the art. Bodyside moldings protect, e.g., vehicle doors, and provide an aesthetically-pleasing appearance. Such moldings may be formed by injection molding and/or extrusion processes.

To form bodyside moldings by an extrusion process, generally one or more continuous, pliable, thermoplastic melt streams from suitable extrusion dyes are introduced into a forming tool which molds the melt stream(s) into a continuous extrusion having a desirable cross-sectional shape. Bodyside moldings are then cut from the continuous extrusion after the extrusion has sufficiently cooled. In one such process, a base layer melt stream is co-extruded along with an upper "show" surface layer having a desirable, aesthetically-pleasing appearance. The show surface material may be of various materials suitable for the extrusion process, including Mylar, chrome or a show thermoplastic graded material.

FIG. 1 illustrates a representative vehicle 3 including decorative bodyside moldings 5 thereon. Each of components 5a, 5b, 5c, 5d and 5e, mounted on respective body portions of the vehicle, represents a bodyside molding. Specifically, bodyside molding part 5a is mounted on front door 7, bodyside molding part 5b is mounted on rear door 9, bodyside molding part 5c is mounted on the fender rearwardly of the front wheel well, and bodyside molding parts 5d and 5e are mounted on the corner panel, forwardly and rearwardly, respectively, of the rear wheel opening of the vehicle.

FIGS. 2–3 illustrate a conventional bodyside molding, including molding body 9 having a hollowed interior, bolt 11, bolt mounting section 13, and seating body 15. As illustrated in FIG. 3, this bodyside molding is to be attached to vehicle 17 by way of bolts 11. As discussed in U.S. Pat. No. 5,639,522 (hereby incorporated herein by reference in its entirety), the bodyside molding of FIGS. 2–3 is manufactured utilizing a hollow injection molding process.

Because bodyside moldings are designed to be aesthetically pleasing to the eye, it is often desired to chrome-plate such moldings. It is known to manufacture hollow one-piece chrome-plated bodyside moldings using a gas-assisted injection molding process as follows. Initially, a flowable material such as TPO (polyolefinic thermoplastic resin) is injected into a dye of an injection molding apparatus. Thereafter, a gas pin is inserted into the material within the dye cavity so as to allow gas (e.g., nitrogen) to be shot via the gas pin into a central portion of the material. The gas causes the flowable material to proceed/move outwardly within the dye against the edges thereof so as to form a hollowed-out piece. The gas pin is thereafter removed from the piece. Upon cooling and removal from the dye, the result is a bodyside molding component. However, this bodyside molding component has a hole or aperture defined therein due to the gas pin which had been inserted through a portion thereof in order to allow the pressurized gas to be introduced.

The molding (including the hole therein) is then processed through numerous liquid/metal baths in order to chrome-plate the same. For example, the molding may first be dipped into an acid bath to prepare its surface to accept metal to be applied in a subsequent bath(s). After removal from the acid bath, the molding is rinsed in a bath and thereafter dipped into an electroplating bath such as a copper or nickel bath. After removal from this copper or nickel bath, rinsing may again occur in another bath, with the molding thereafter being dipped in a chrome bath for electroplating the molding body with chrome. In short, a plurality of baths are utilized during the chrome plating process, with the bodyside molding being moved from one bath to the next in serial fashion as the process progresses.

Unfortunately, the hole in the molding due to the gas pin described above is problematic. This hole tends to collect materials from the different baths used in the electroplating process (e.g. liquid/chemicals from a bath can either collect in the hole itself or seep into the hollow interior of the body through the hole) which ultimately can lead to bath(s) contamination. For example, the hole may collect acid from the acid bath. Upon removal from the acid bath, acid therefrom is located in the hole itself and/or within the hollow interior (i.e., cavity) of the molding. The rinsing process may thus not be able to effectively remove all/most traces of the acid from the hole and/or cavity of the molding. As a result, when the molding is subsequently placed into another bath during the chrome plating process (e.g., a nickel bath, copper bath, and/or chrome bath), contaminates from earlier bath(s) may make their way thereinto causing bath contamination. In other words, later baths or tanks in the electroplating process may become contaminated due to the tendency of the hole-inclusive molding to collect and transport materials from one bath to the next during the process.

It is apparent from the above that there exists a need in the art for a bodyside molding which may be manufactured in a manner such that the likelihood of bath/tank contamination is reduced during the chrome-plating process.

This invention will now be described with respect to certain embodiments thereof, accompanied by certain illustrations.

SUMMARY OF THE INVENTION

An object of this invention is to provide a two-piece bodyside molding which may be electro-plated in a manner so as to reduce the likelihood of bath/tank contamination during an electroplating (e.g. chrome plating) process.

Another object of this invention is to provide a two-piece bodyside molding, wherein one of the two pieces is chrome plated and the other of the two pieces is not chrome plated.

Another object of this invention is to provide a two-piece bodyside molding including a cover piece and a base piece, wherein the cover piece is chrome plated and the base piece is hidden from view by the plated cover piece.

Another object of this invention is to provide a two-piece bodyside molding including a cover piece and a base piece, wherein the cover piece is chrome plated before being affixed or connected to the base piece. In certain embodiments, the cover piece is shaped in a manner so as to reduce the likelihood of bath contamination during the chrome plating thereof.

In certain embodiment of this invention, the chrome plated cover piece may be attached or connected to the non-chrome-plated base piece via vibration welding, via heat deformation of heat stakes or tabs described below, via a snap-fit design, via sonic welding, or in any other suitable manner.

Another object of this invention is to fulfill any or all of the above-listed objects.

Generally speaking, this invention fulfills any or all of the above described objects/needs by providing a bodyside molding to be attached to a vehicle, the bodyside molding comprising:

a base having first and second spaced apart apertures defined therein;

a chrome plated cover including first and second sidewalls between which a channel is defined; and wherein an end of said first sidewall is connected to a first portion of said base and an end of said second sidewall is connected to a second portion of said base.

This invention further fulfills any or all of the above described objects/needs by providing a method of making a bodyside molding for a vehicle, the method comprising the steps of:

forming a cover piece;

forming a base piece so as to include at least first and second spaced apart apertures defined therein;

plating or coating at least a portion of the cover piece;

inserting first and second end portions of the plated or coated cover piece into the first and second apertures of the base, respectively;

heating at least portions of the first and second end portions which extend through the first and second apertures, respectively; and deforming heated portions of the first and second end portions which extend through the first and second apertures, respectively, so as to connect the cover piece to the base piece.

DETAILED DESCRIPTION OF CERTAIN EMBODIMENTS OF THIS INVENTION

Figure 1:
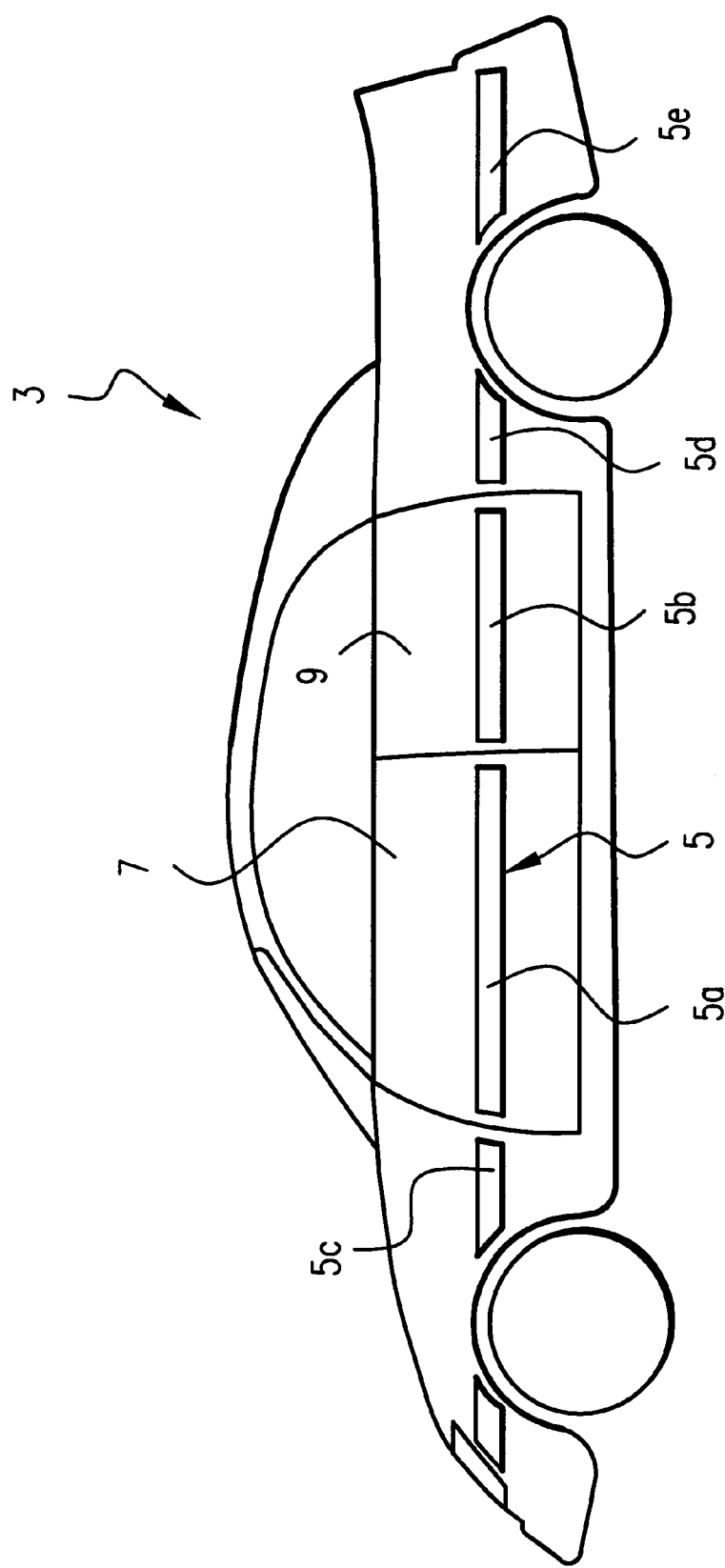
FIG. 1 is a perspective view of an automobile including conventional bodyside moldings thereon.

Referring now more particularly to the accompanying drawings in which like reference numerals indicate like parts throughout the several views.

Certain embodiments of this invention relate to a bodyside molding which is at least partially electroplated (e.g., chrome plated). The molding may be placed on the exterior of a vehicle for aesthetic purposes. Any bodyside molding herein may be positioned on a vehicle in any of the locations illustrated in FIG. 1, or on any vehicle at any other suitable location where a bodyside molding is desired. Moreover, it is noted that the phrase(s) "chrome plated" and "chrome plating" as used herein refers to both actual chrome plating as well as any other material which may be applied that resembles chrome in appearance.

Figure 4:
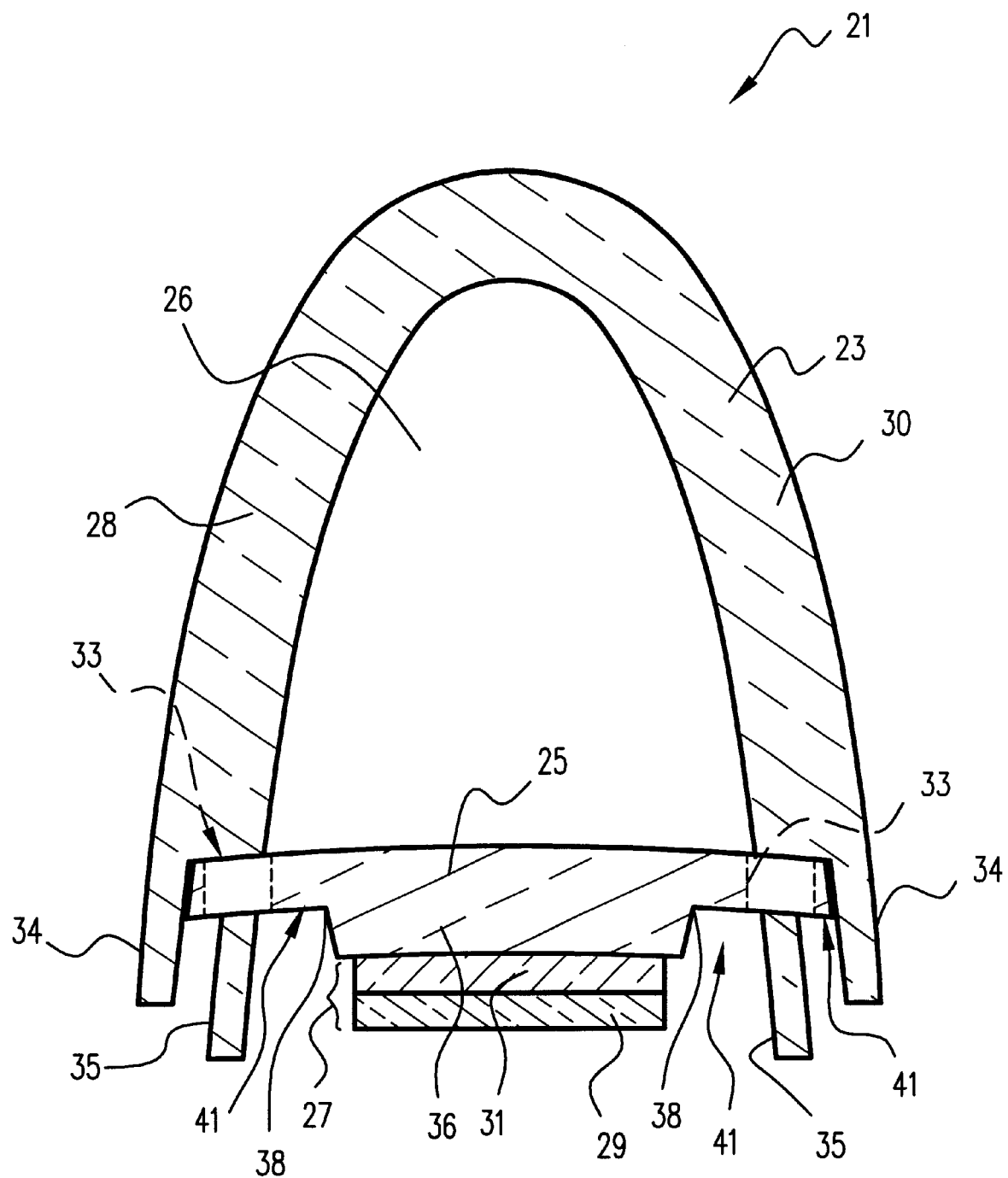
FIG. 4 is an end cross-sectional view of a two-piece bodyside molding according to an embodiment of this invention.

FIG. 4 is an end cross-sectional view of bodyside molding 21 according to an embodiment of this invention. Bodyside molding 21 includes elongated cover 23 connected to elongated base 25. Cover 23 may be approximately U-shaped (as in FIG. 4), V-shaped, or square shaped according to different embodiments of this invention, so as to define channel 26 between opposing cover sidewalls 28 and 30 as illustrated in FIG. 4. Base 25 is at least partially planar in shape, including upper and lower major surfaces, in certain embodiments of this invention. As shown in FIG. 4, base 25 may be formed so as to include a thicker portion 36 upon which tape assembly 27 is to be mounted. Thicker base portion 36 may be defined by angled steps extending upwardly from their respective intersections 38 with thinner base portions.

As for cover 23, respective ends of sidewalls 28, 30 include outer tongs/tabs 34 and inner tongs/tabs 35 integrally formed with the rest of the cover, as illustrated in FIG. 4. Inner tongs/tabs 35 extend through corresponding apertures or holes 33 defined in base 25 in order to connect the cover to the base. Outer tongs 34 serve to hide base 25 (which need not be chromed plated) from view after the molding 21 has been affixed to a wheeled vehicle.

Thermoplastic cover 23 is connected to thermoplastic base 25 by inner tongs/tabs 35. After tongs/tabs 35 are inserted through respective apertures 33 in base 25, the distal ends of the tongs/tabs 35 which protrude/extend through these apertures are heated and deformed (e.g., mushroomed) up against the bottom of base 25. After cooling of the heated portions of tongs/tabs 35, the tongs/tabs 35 are locked or otherwise affixed in place adjacent the underside of the base. Thus, while FIG. 4 illustrates outer tongs/tabs 34 in the form in which they exist both prior to and after cover 23 has been connected to base 25, this Figure shows inner tongs/tabs 35 in their respective forms prior to heating (i.e. after heating, the inner tongs may be mushroomed up against the underside of the base). In certain embodiments of this invention, adjacent tabs 34 and 35 are approximately parallel to one another at the end of each sidewall 28, 30, as illustrated in FIG. 4, prior to heating and deformation of inner tabs 35. Following heating and deformation of at least inner tabs 35, the entireties of tabs 35 are no longer approximately parallel with adjacent outer tabs 34, although portions of tabs 35 within apertures 33 may remain approximately parallel to adjacent portions of outer tabs 34.

Bodyside molding 21 may be affixed to a vehicle by way of double-sided tape system 27 which initially includes layers 29 and 31. Tape layer 31 may comprise acrylic foam tape attached to the lower major surface of base 25. Generally speaking, one side of tape layer 31 is fastened to base 25 at the site of manufacture, with release layer 29 being provided on the remaining outwardly-facing side of tape 31. Release layer 29 is left in place and removed just prior to attachment of molding 21 to an assembled piece of a vehicle. In other words, after shipment of the molding to an automotive assembly location, release layer 29 is removed so that tape layer 31 can be used to adhere molding 21 to desired vehicle component(s) 17.

Figure 5:
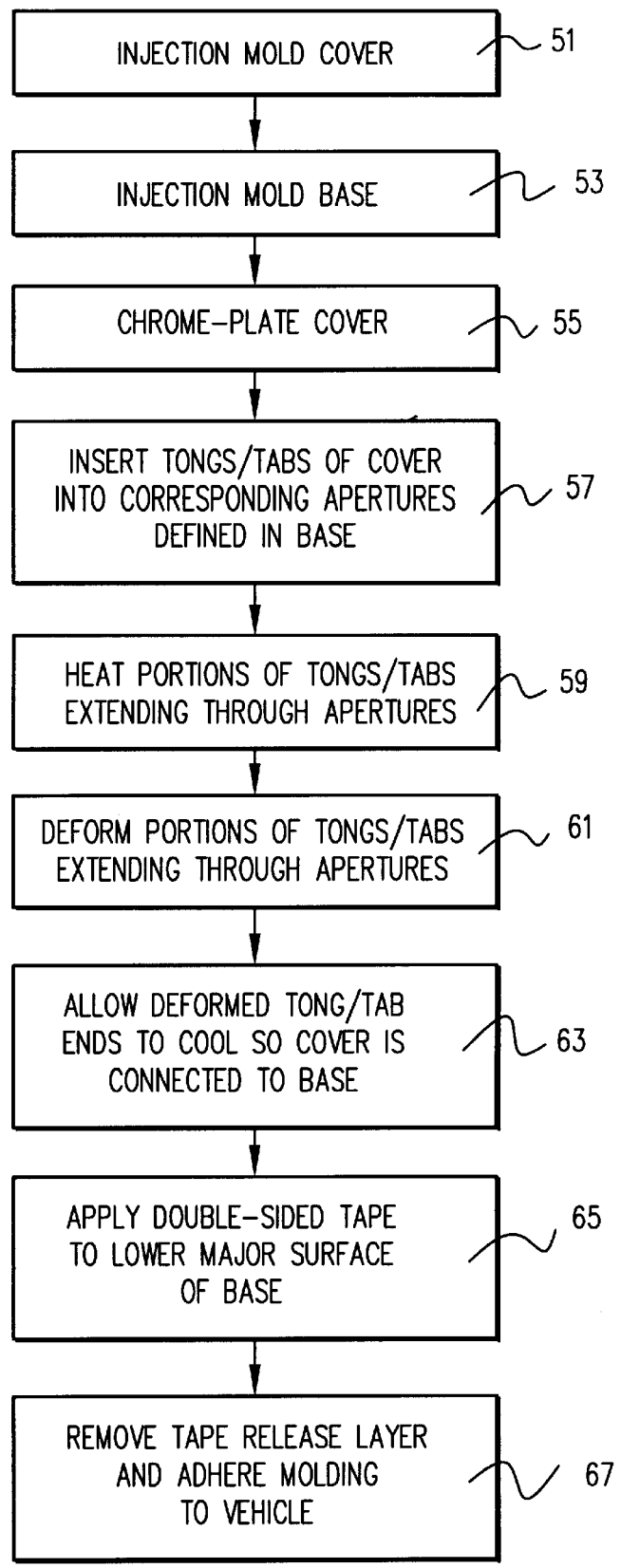
FIG. 5 is a flow chart illustrating steps taken during the manufacture of the two-piece bodyside molding of FIG. 4.

An exemplary manner of manufacturing bodyside molding 21 will now be described with reference to at least FIGS. 4 and 5. Initially, cover 23 and base 25 are injection molded using separate injection molding dyes and respective dye cavities (steps 51 and 53). In preferred embodiments, cover 23 and base 25 are made of or include ABS (acrylonitrile-butadiene-styrene) or PC-ABS (mixture of polycarbonate and ABS). However, in alternative embodiments, cover 23 and base 25 may instead be made of or include TPO, polyethylene, polypropylene, surlyn, nylon, polycarbonate (PC), PVC, or the like. Moreover, while cover 23 and base 25 are initially separately formed via injection molding in preferred embodiments, they may instead be formed using separate extrusion techniques in other embodiments of this invention.

Base 25 is molded in a manner so as to include thru-holes 33 therein which extend from one major surface through the body of the base to the other major surface thereof. Following its removal from its injection molding cavity, base 25 need not be chrome plated (although it may be in certain non-preferred embodiments).

As for cover 23, after removal from its injection molding dye, cover 23 is in the form illustrated in FIG. 4 (absent attachment to the base). Prior to being attached to the base, cover 23 is chrome plated (e.g. by an electro-plating technique as described above which includes multiple baths or tanks utilized in series with one another) (step 55). Elongated non-hollow cover 23 is shaped so that it does not include any cavities or apertures which tend to collect liquid which can contaminate subsequent baths in the chrome-plating process. Cover 23 is elongated in the direction extending in and out of the paper relative to FIG. 4 in a manner similar to the molding in FIG. 2.

After cover 23 has been chrome plated (step 55), inner tongs/tabs 35 thereof are inserted through apertures/holes 33 of non-chrome plated base 25 (step 57). Simultaneously, outer tongs 34 extend downwardly around a peripheral portion/edge of base 25 so as to cover and hide from view outer edges of the base. Portions of inner tongs/tabs 35 which extend through apertures/holes 33 are then heated (e.g., via hot air heated to a temperature of about 300–400° F., preferably about 350° F.) to a degree sufficient so that the heated portions of the tongs can be deformed in a manner such that they mushroom onto or against a bottom surface 41 of base 25 (steps 59 and 61). The mushroomed (i.e., at least partially flattened or otherwise deformed in a manner so as to contact the bottom surface of the base) tong portions are then allowed to cool (step 63). After cooling, cover 23 is mechanically connected to base 25 so as to form bodyside molding 21, as the mushroomed portions of tongs 35 prevent these tongs from being pulled back through apertures 33. Thereafter, double sided tape system 27 may be adhered to a bottom surface of base 25 (step 65). When it is desired to adhere the molding to a vehicle, release layer 29 is removed so that tape layer 31 can be used to adhere molding 21 to the vehicle (step 67). Chrome plated outer tongs/tabs 34, in certain embodiments, are sufficiently long so that they hide non-chromed plated base 25 from view after the molding has been adhered to the vehicle.

Figure 2:
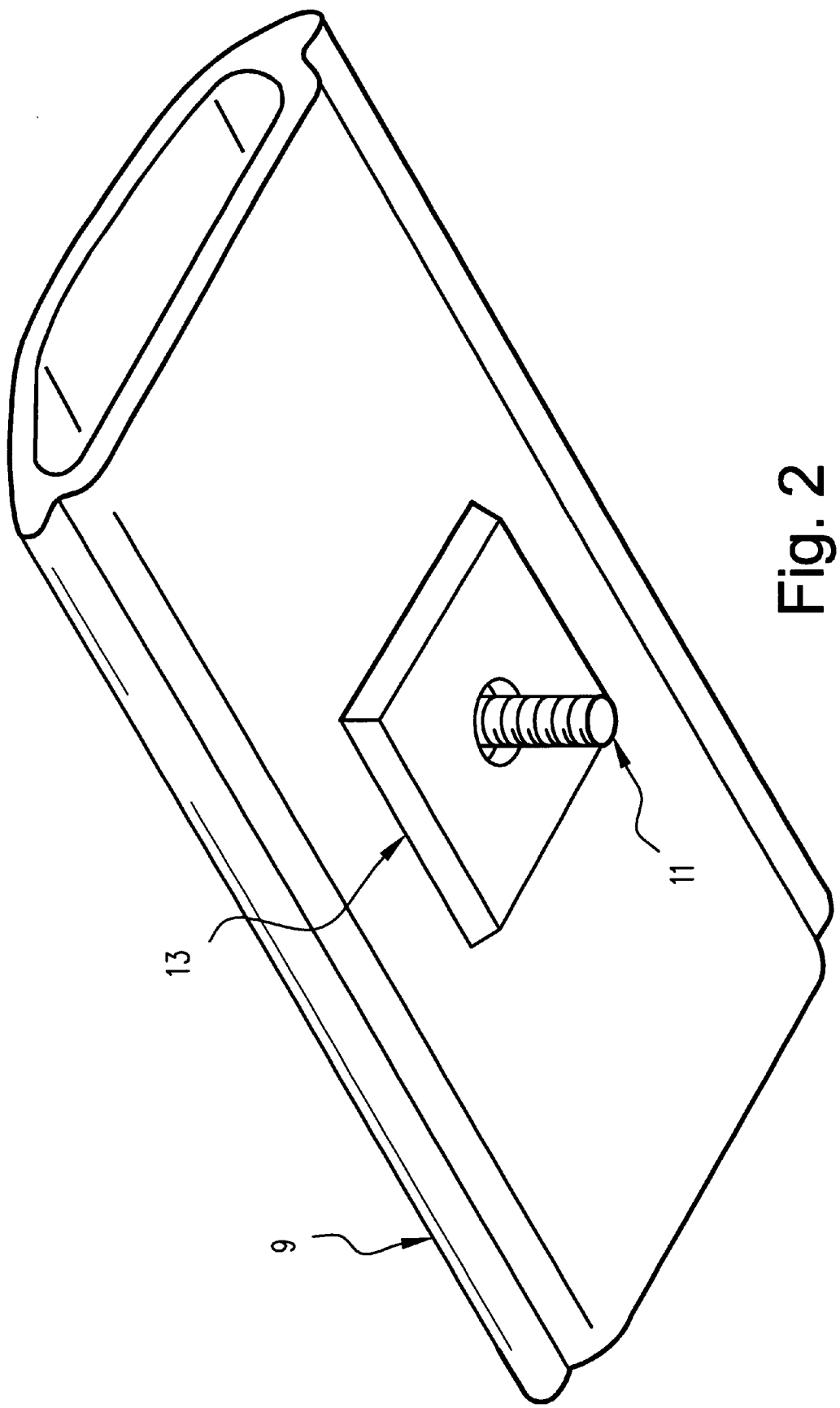
FIG. 2 is a perspective view of a conventional hollowed-out bodyside molding.
Figure 3:
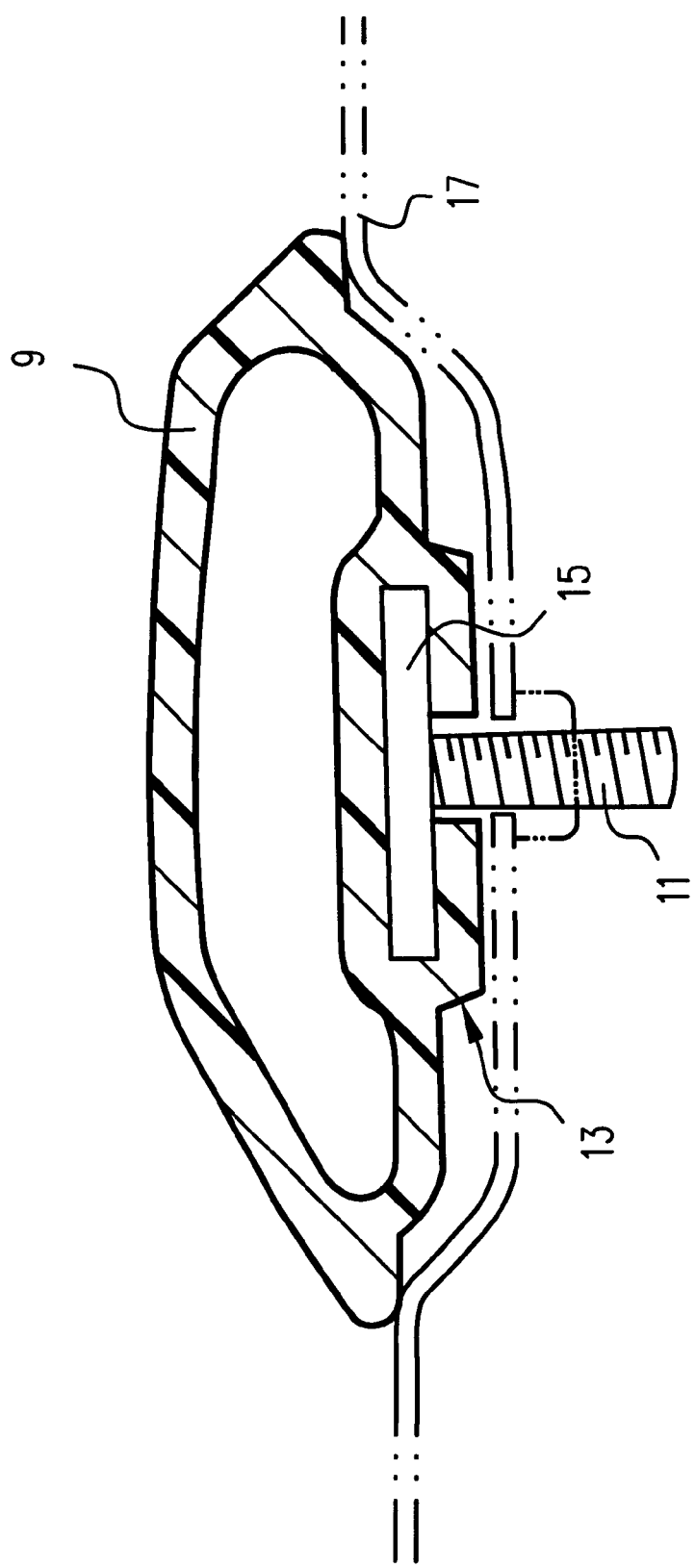
FIG. 3 is an end cross-sectional view of the conventional bodyside molding of FIG. 2 affixed to a vehicle.
Figure 6:
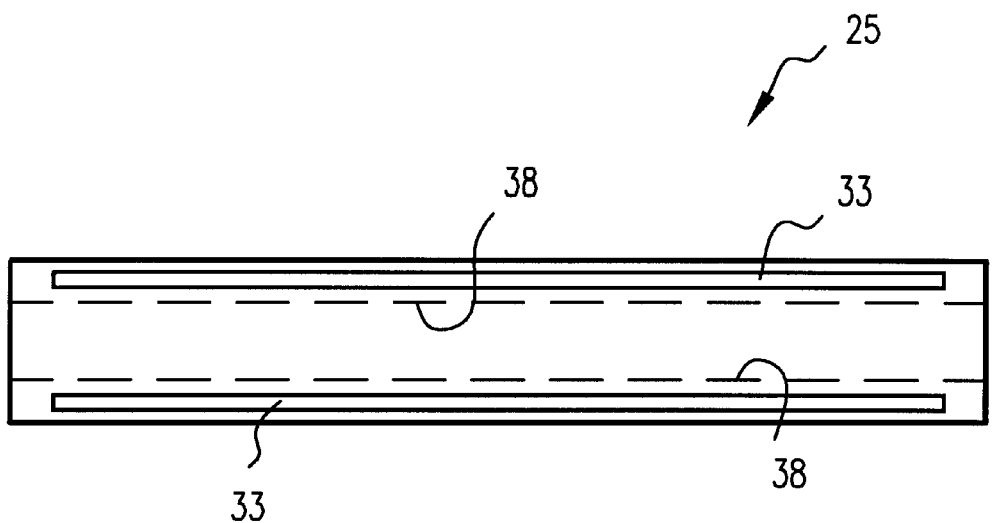
FIG. 6 is a top plan view of a base of the FIG. 4 molding according to a first embodiment of this invention.

As shown in FIGS. 1–2, all bodyside moldings herein are elongated in shape in certain embodiments. Thus, in certain embodiments, apertures/holes 33 in the base may be elongated in shape so as to resemble thru-slots which extend a substantial portion of the length of the molding as shown in FIG. 6. In such embodiments, tongs/tabs 34, 35 are likewise elongated in shape so as to also extend a substantial portion of the length of the molding (i.e., a single elongated tong(s) 34, 35 is provided on each side of the cover extending substantially the entire length of the cover).

Figure 7:
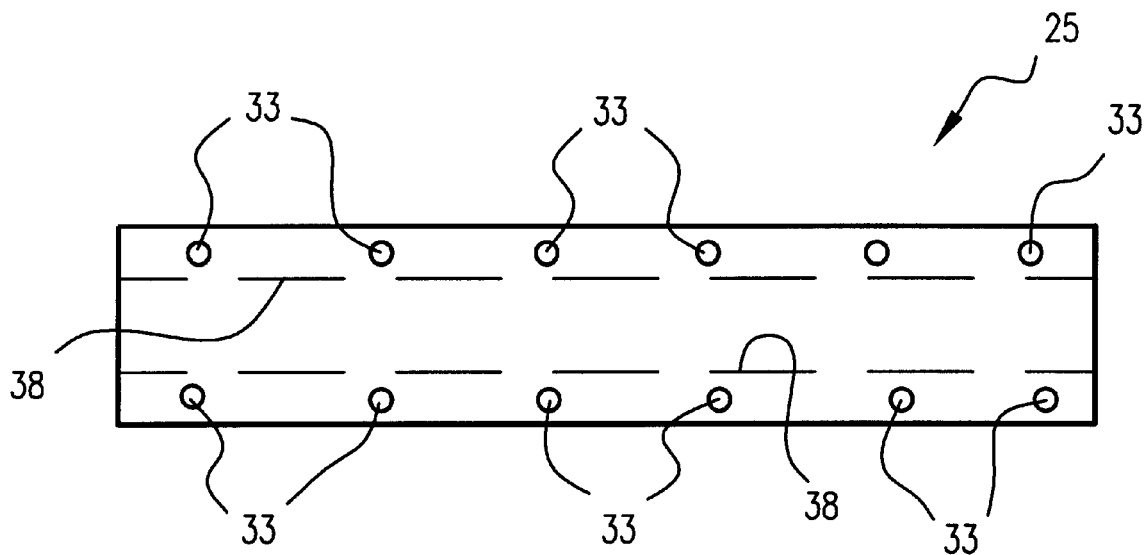
FIG. 7 is a top plan view of a base of the FIG. 4 molding according to a second embodiment of this invention.

However, in other embodiments of this invention, a plurality of separate, distinct, and spaced-apart apertures/holes 33 may be provided along each side of the base as shown in FIG. 7. In such embodiments where the apertures are spaced apart as in FIG. 7, outer tongs 34 may remain elongated so as to extend substantially the entire length of the cover, while a plurality of spaced apart inner connecting tongs/tabs 35 are provided on each side of the cover so as to correspond with the spaced apart apertures 33 shown in FIG. 7.

In embodiments discussed above, a tape system is described for attaching the bodyside molding to a vehicle. However, in other embodiments of this invention, the molding may be attached to a vehicle in other manners (e.g., via fasteners, via clips, via W-base clips which may snap into place, or the like).

In embodiments discussed above, the ends of the cover are inserted through the base and thereafter heated in order to attach the cover to the base. However, in other embodiments of this invention, the cover may instead by glued or otherwise adhered to the base, or alternatively the cover may be sonic welded to the base without tabs. In other embodiments, the cover may be sonic welded to the base with or without tabs.

Figure 8:
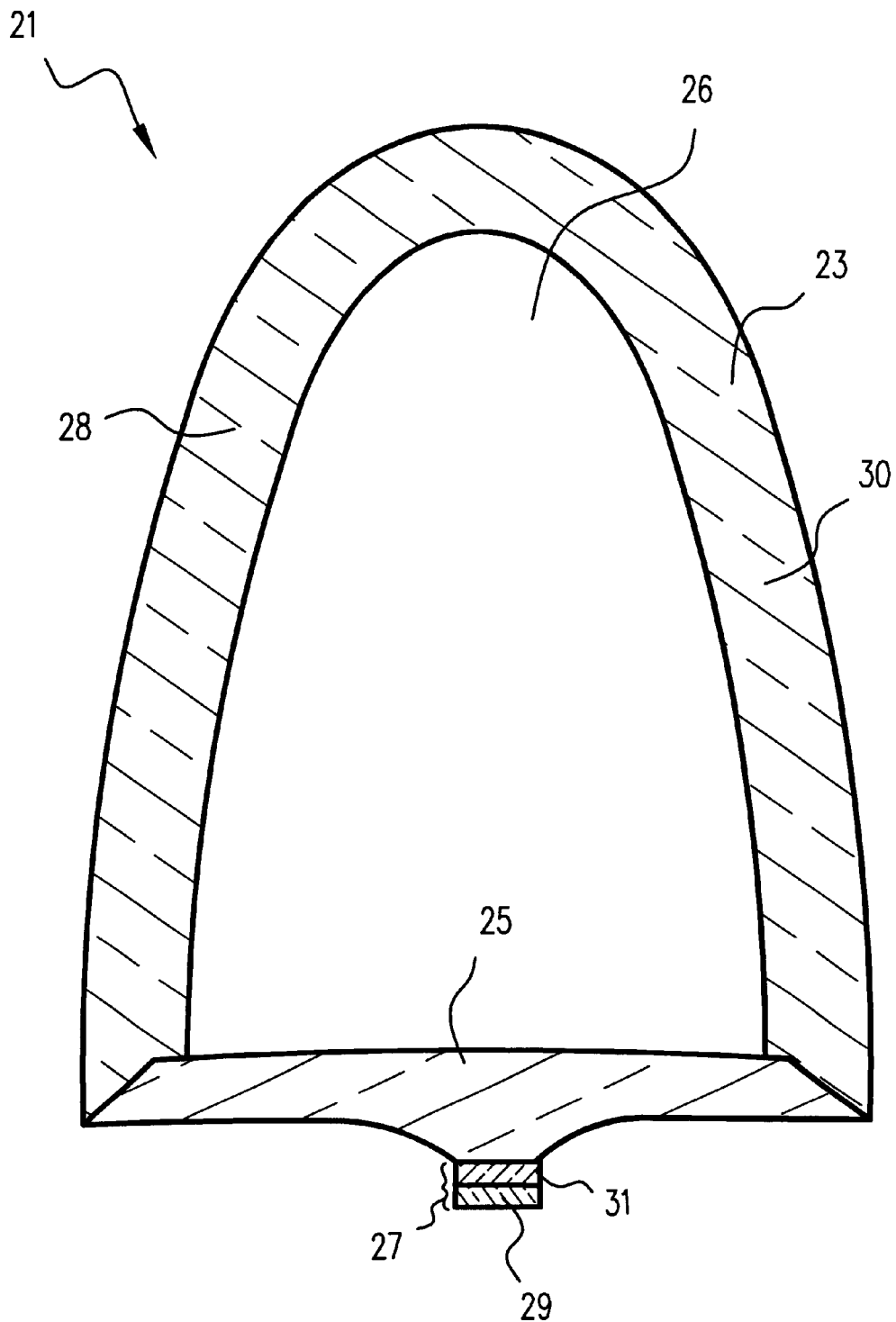
FIG. 8 is an end cross-sectional view of a two-piece bodyside molding according to an embodiment of this invention, where the cover is attached or connected to the base via welding (e.g., sonic or vibration welding).

For example, FIG. 8 illustrates an embodiment wherein the cover is connected or attached to the base via ultrasonic or vibration welding. Tabs 35 are not necessary in this embodiment; and neither are apertures 33 in the base. Respective ends of the cover are welded to at least an upper surface of the base in this embodiment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while exemplary embodiments discussed above refer to chrome plating of the cover piece, it will be understood by those skilled in the art that any other type of plating or coating may instead be applied to the cover piece via any type of plating/coating process.

What is claimed is:

1. A bodyside molding to be attached to a vehicle, the bodyside molding comprising:
   an elongated base;
   an electroplated cover including first and second portions between which an elongated channel is defined; and
   wherein an end of said first portion of said cover is welded to a first portion of said base and an end of said second portion of said cover is welded to a second portion of said base.

2. The bodyside molding of claim 1, wherein said first and second portions comprise first and second sidewalls, respectively, and wherein said cover is approximately U-shaped with the trough of the "U" being located in spaced relation from said base.

3. The body side molding of claim 1, wherein said end of said first portion of said cover is vibration welded to said first portion of said base, and said end of said second portion of said cover is vibration welded to said second portion of said base.

* * * * *